United States Patent [19]
Ando et al.

[11] Patent Number: 4,890,233
[45] Date of Patent: Dec. 26, 1989

[54] VEHICLE BEARING DETECTION AND DATA PROCESSING METHODS APPLICABLE TO VEHICLE NAVIGATION SYSTEM

[75] Inventors: Hitoshi Ando; Takashi Kashiwazaki; Masayuki Hosoi; Atsuhiko Fukushima, all of Saitama, Japan

[73] Assignee: Pioneer Electronic Corporation, Tokyo, Japan

[21] Appl. No.: 113,109

[22] Filed: Oct. 27, 1987

[30] Foreign Application Priority Data

| Oct. 27, 1986 | [JP] | Japan | 61-255461 |
| Oct. 27, 1986 | [JP] | Japan | 61-255462 |
| Oct. 27, 1986 | [JP] | Japan | 61-255463 |
| Oct. 27, 1986 | [JP] | Japan | 61-255464 |
| Oct. 27, 1986 | [JP] | Japan | 61-255466 |
| Oct. 30, 1986 | [JP] | Japan | 61-259223 |

[51] Int. Cl.⁴ .................. G01C 21/00; G08G 1/12
[52] U.S. Cl. ..................... 364/457; 364/460; 340/995; 73/178 R; 318/587; 33/356; 33/320
[58] Field of Search ............... 364/457, 460; 340/995; 73/178 R, 505, 510; 33/356, 320; 318/587

[56] References Cited

U.S. PATENT DOCUMENTS

| 4,402,050 | 8/1983 | Tagami et al. | 364/460 |
| 4,429,469 | 2/1984 | Tsushima et al. | 33/356 |
| 4,445,118 | 4/1984 | Taylor et al. | 342/357 |
| 4,517,565 | 5/1985 | Nakamura et al. | 364/457 |
| 4,521,777 | 6/1985 | Nakamura et al. | 33/356 |
| 4,524,357 | 6/1985 | Nakamura et al. | 33/356 |
| 4,635,202 | 1/1987 | Tsujii et al. | 340/995 |
| 4,660,037 | 4/1987 | Nakamura | 340/995 |
| 4,661,811 | 4/1987 | Gray et al. | 340/995 |
| 4,731,613 | 3/1988 | Endo et al. | 342/357 |
| 4,734,863 | 3/1988 | Honey et al. | 364/457 |
| 4,743,913 | 5/1988 | Takai | 342/357 |
| 4,754,280 | 6/1988 | Brown et al. | 342/357 |

Primary Examiner—Thomas H. Tarcza
Assistant Examiner—David Cain
Attorney, Agent, or Firm—Sughrue, Mion, Zinn, Macpeak & Seas

[57] ABSTRACT

The invention provides various methods for detecting the bearing of a moving vehicle and of processing data in a vehicular navigation system. Provided there is carried out a process of recognizing the present position of the vehicle while the vehicle is moving at a predetermined speed, bearing data obtained from a prestored map is utilized to determine the present position of the vehicle. At that time, the data output from a terrestrial magnetism sensor, which would otherwise be used, is discarded.

16 Claims, 14 Drawing Sheets

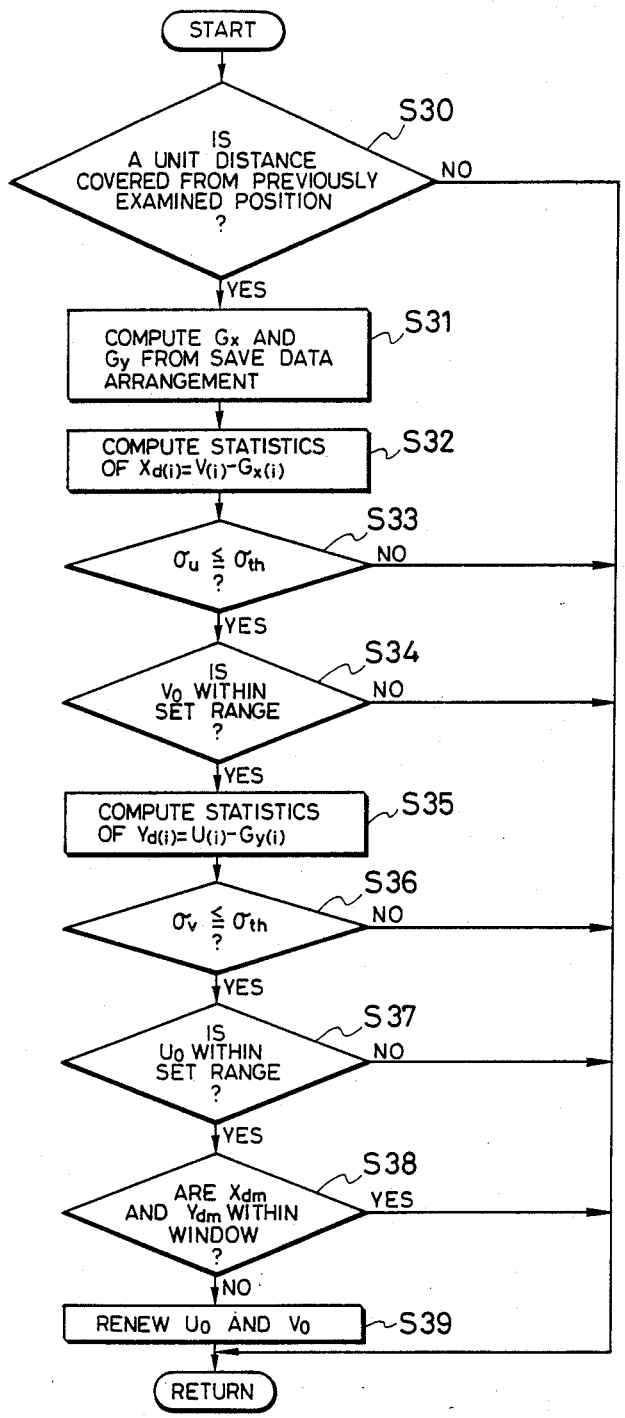

VEHICLE BEARING DETECTION AND DATA PROCESSING METHODS APPLICABLE TO VEHICLE NAVIGATION SYSTEM

BACKGROUND OF THE INVENTION

The present invention relates to methods of detecting vehicle bearings and of processing data in a vehicle navigation system, and more particularly to methods of detecting the bearing of a vehicle using a terrestrial magnetism sensor and an angular velocity sensor and of processing the data obtained.

Research and development activities are being directed to providing a vehicle navigation system for guiding a vehicle to an intended destination by having not only map information but also the present vehicle location displayed on a display unit, the map information being prestored in and read out of a memory.

The navigation system must be equipped with a bearing sensor for detecting the bearing of the vehicle. For such a bearing sensor, there may be employed a terrestrial magnetism sensor for detecting the bearing of the vehicle according to terrestrial magnetism (the magnetic field of earth). Also, there may be used an angular velocity sensor for detecting the bearing of the vehicle by detecting the vehicle's angular velocity. However, the terrestrial magnetism sensor is easily affected by external disturbances, and its output tends to include a gross error when the vehicle passes a railroad crossing, an iron or steel bridge, a large vehicle (e.g., a truck or bus), or the like.

Moreover, because the bearing obtained from the output data of the angular velocity sensor is not an absolute bearing, drift in the calculated bearing may occur.

To obtain the bearing of the vehicle from the output data of the angular velocity sensor, the data supplied by the angular velocity sensor when no angular velocity exists (i.e., when the vehicle is not turning) is assumed, as the central value $G_{dc}$ of the sensor output. The displacement is then obtained according to the central value $G_{dc}$ and it is integrated with respect to time to obtain the bearing. However, the central value $G_{dc}$ may fluctuate due to temperature changes. If the central value $G_{dc}$ fluctuates when the bearing is computed, the error caused thereby becomes a drift of the bearing. Also, the characteristics of the circuit (e.g., operational amplifier) used for detecting the output from the angular velocity sensor may cause the angle of rotation obtained from the output data of the angular velocity sensor not to be 90 degrees even though the vehicle has actually turned in a 90-degree arc. For this reason, there must be applied a coefficient of error correction. If the angle of rotation of the vehicle thus obtained is still inaccurate when the coefficient of correction is applied, an additional error will become unavoidable.

SUMMARY OF THE INVENTION

In view of the aforementioned problems, an object of the present invention is to provide a method of detecting the bearing of a vehicle with great accuracy by enhancing the reliability of bearing data obtained from a terrestrial magnetism sensor and an angular velocity sensor.

Another object of the present invention is to provide a method of processing data obtained from a terrestrial magnetism sensor and an angular velocity sensor for the purpose of navigating a vehicle precisely by increasing the reliability of the bearing data obtained from the terrestrial magnetism sensor and the angular velocity sensor to thus accurately detect the bearing of the vehicle.

The method of detecting the bearings of a vehicle according to the present invention is characterized by the steps of employing a bearing obtained from map data, provided there has been carried out a process of recognizing the present vehicle location on the basis of the map data while the vehicle is traveling at a predetermined speed, and discarding the output data of the terrestrial magnetism sensor.

The method of detecting the bearing of a vehicle according to the present invention is further characterized by the steps of setting up a range allowing for fluctuations in the output data of the terrestrial magnetism sensor and, as far as the output data of the terrestrial magnetism sensor is within that range allowed, conforming the bearing obtained from the output data of the terrestrial magnetism sensor to what is obtained from the angular velocity sensor, thereby correcting the bearing obtained from the angular velocity sensor.

Making use of the fact that the angular velocity becomes zero when the vehicle stands still, the method of detecting the bearing of a vehicle according to the present invention is also characterized by the steps of monitoring the output data of the angular velocity sensor while the vehicle is standing still and, if there is a drift of the output data, correcting the bearing obtained from the angular velocity sensor by ignoring the bearing obtained from the output data of the angular velocity sensor but conforming the bearing to, e.g., the output data of the terrestrial magnetism sensor or the bearing obtained from the map data.

The method of detecting the bearing of a vehicle according to the present invention is still further characterized by the step of conforming the bearing obtained from the output data of the angular velocity sensor to the bearing obtained from the map data, provided there has been carried out a process of recognizing the present vehicle location on the basis of the map data while the vehicle is traveling at a predetermined speed, thereby correcting the bearing obtained from the angular velocity sensor.

The method of processing data obtained from the terrestrial magnetism sensor in a vehicle navigation system equipped with an auxiliary bearing sensor together with the terrestrial magnetism sensor according to the present invention is characterized by the steps of sampling the output data of both the sensors each unit distance or unit time covered by the vehicle, and correcting the output of the terrestrial magnetism sensor according to the output data of the auxiliary bearing sensor when a significant difference is observed between the data.

Yet further, the method of processing data obtained from the angular velocity sensor according to the present invention is characterized by the steps of detecting turning of the vehicle, computing, the angle of rotation during turning both based on the output data of the angular velocity sensor and based on the output data of the terrestrial magnetism sensor, and setting the ratio of the former to the latter as a coefficient of correction for the angular velocity sensor.

BRIEF DESCRIPTION OF THE DRAWINGS

FIGS. 15 and 16 are flowcharts showing procedures for processing data from the terrestrial magnetism sensor which are executed by the CPU in FIG. 1;

DESCRIPTION OF THE PREFERRED EMBODIMENTS

Referring now to the accompanying drawings, preferred embodiments of the present invention will subsequently be described in detail.

Figure 1:
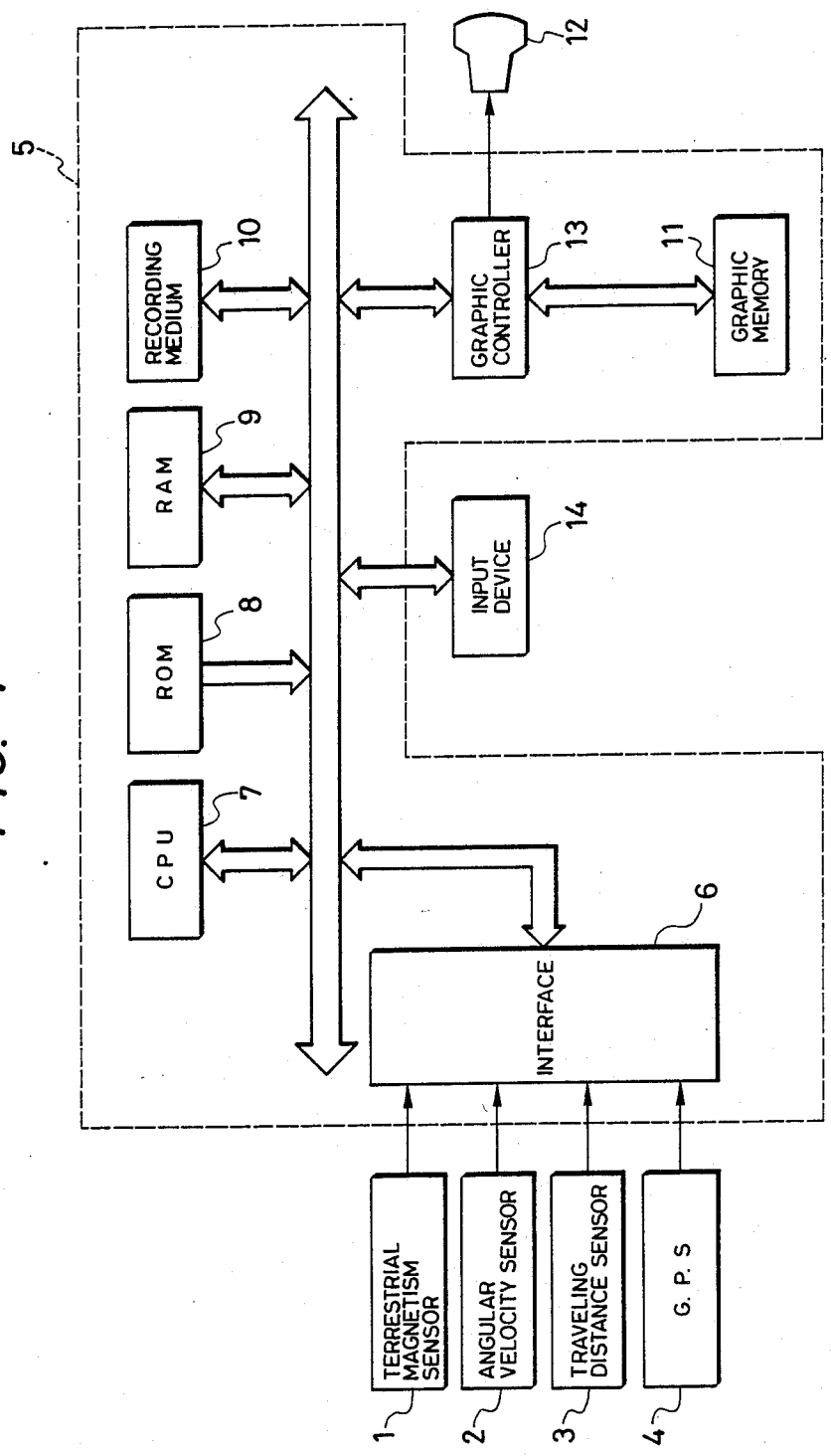
FIG. 1 is a block diagram showing the construction of a vehicle navigation system to which a method of detecting the bearing of a vehicle according to the present invention is applied.

FIG. 1 is a block diagram showing the construction of a vehicle navigation system to which a method of detecting the bearing of a vehicle according to the present invention is applied. As shown in FIG. 1, the vehicle navigation system includes a terrestrial magnetism sensor 1 for producing vehicle bearing data based on terrestrial magnetism (the magnetic field of earth), an angular velocity sensor 2 for detecting the angular velocity of the vehicle, a traveling distance sensor 3 for detecting the distance the vehicle moves, and a GPS (Global Positioning System) for detecting the present vehicle location from the latitude and the longitude thereof. The output of each sensor is supplied to a system controller 5.

The system controller 5 includes an interface 6 for receiving the output of each sensor 1 to 4 and subjecting the output to A/D (Analog/Digital) conversion, A CPU (Central Processing Unit) 7 for processing various types of image data and computing the movements of the vehicle based on the output data of each sensor (1 to 4), a ROM (Read Only Memory) 8 in which are prestored processing programs for the CPU 7 and other necessary data, a RAM (Random Access Memory) 9 with data written thereto or read therefrom when necessary for executing the programs, a CD-ROM (Compact Disk - Read Only Memory), and IC memory cards, including a graphic memory 11 inclusive of a recording medium 10 in which are stored map information in digital form and a graphic controller 13 which effects storing in a graphic memory 11 and presentation on a display 12 in image form graphic data such as maps supplied by the CPU 7. An input device 14 may include a keyboard, etc., and is used to enter instructions to the system controller 5.

Figure 2:
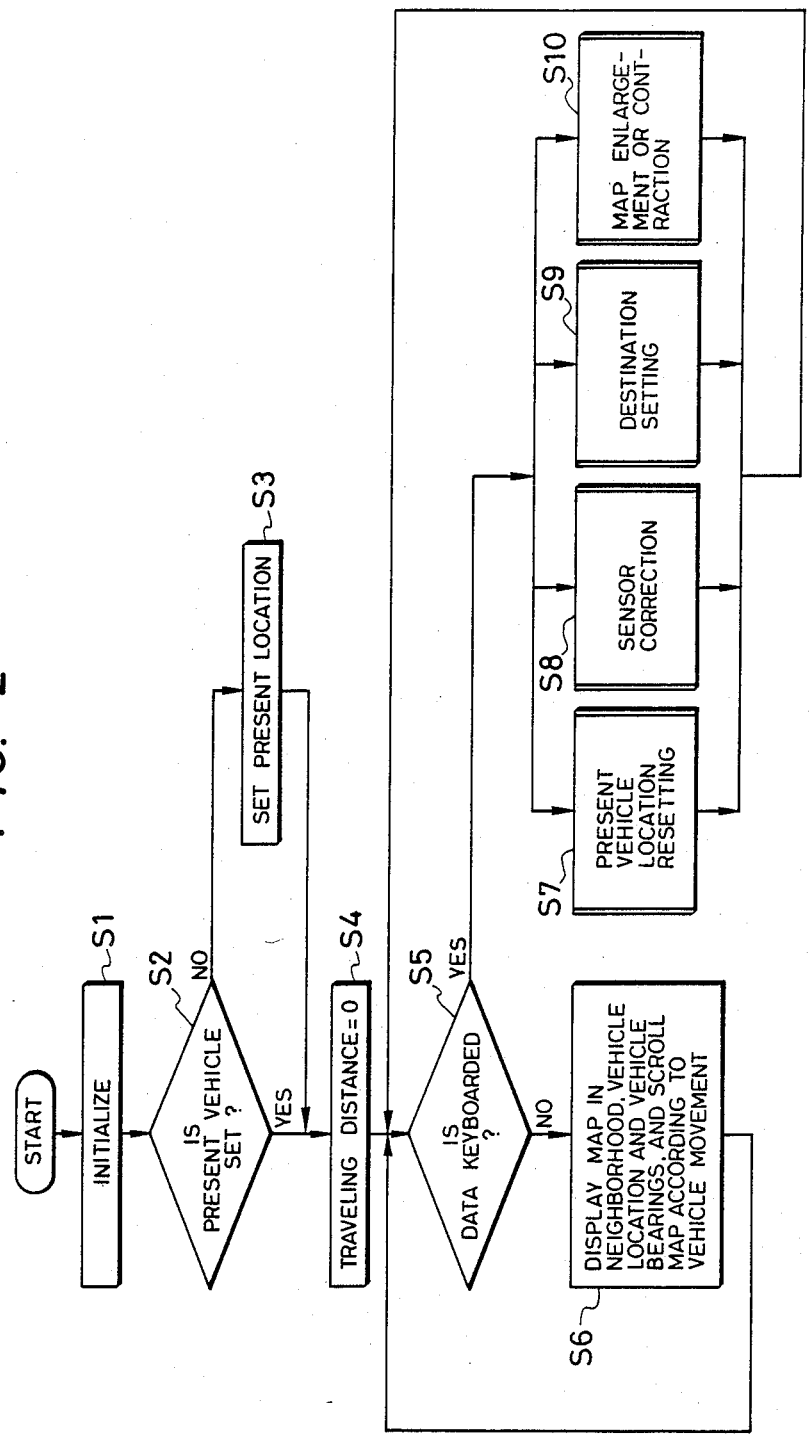
FIGS. 2 and 3 are flowcharts showing basic procedures executed by the CPU in FIG. 1.

Referring to the flowchart of FIG. 2, a basic procedure executed by the CPU 7 will be described.

The CPU 7 first executes to an initialization routine to start a program (STEP S1) and decides if the present vehicle location has been set (STEP S2). If the present location is not set, a present location setting routine is keyboarded at the input device 14 and executed (STEP S3) to set the present location. Then, the traveling distance is set to zero. Subsequently, the CPU 7 decides if data has been keyboarded at the input device 14 (STEP S5).

If no data is keyboarded, the CPU 7 effects the display of a map of the neighborhood of the present vehicle location on the display 12 and displays not only the present vehicle location but also its bearing on the map by means of a vehicle mark. If the vehicle moves further, the CPU 7 scroll 5 the map and, if the present vehicle location is likely to move away from the map data range as the vehicle moves, the CPU 7 further reads necessary map data from the recording medium 10 and has the data displayed on the display 12 (STEP S6).

Figure 6:
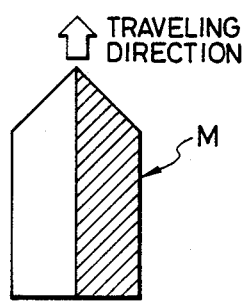
FIG. 6 is an example of a vehicle mark displayed on a display.
Figure 7:
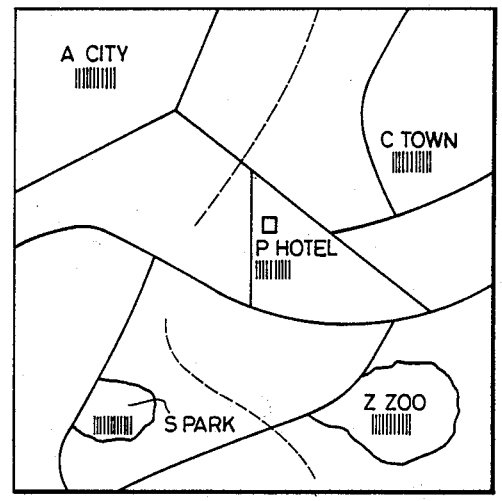
FIG. 7 is a chart with data shown in the form of a bar code.

As shown in FIG. 6, a vehicle mark M is provided, which is divided into two sections, left and right sections, bearing different colors with respect to the direction in which the vehicle is traveling. Even though the vehicle mark M proceeds on the display 12 points directly upwards, the right side can be distinguished from the left side of the display and it hence it is readily possible to distinguish the right from left turns of the vehicle, irrespective of the direction which the vehicle mark M on the display 12 follows.

Although the vehicle mark is divided into two differently colored portions with respect to the direction in which the vehicle travels, the present invention is, needless to say, not limited to such as application, and, when the map image is displayed with the map bearing held constant, irrespective of the vehicle bearing, it is only required to make the vehicle mark displayed on the map asymmetrical with respect to the direction in which the vehicle is traveling.

When input data is keyboarded, each of the routines including present vehicle location resetting (STEP S7), sensor correction (STEP S8), destination setting (STEP S9), and map enlargement or reduction (STEP S10) is executed according to the input data.

Although the present vehicle location setting in STEP S7 and the destination setting in STEP S9 are to be keyboarded, city names and other data may be indicated on the maps with bar codes, so that a bar code reading device (not shown) may be used to read bar codes and write them as data with much less trouble.

The type of data indicated in the bar codes preferably varies with the scale. When the scale is small, for instance, the names of states, cities and towns should be presented, and when the scale is increased, more detailed data such as the names of parks, hotels, department stores, etc., are indicated. Moreover, for example, a map specifically showing only restaurants may be employed to avoid clutter by displaying too many items of data at one time.

Figure 3:
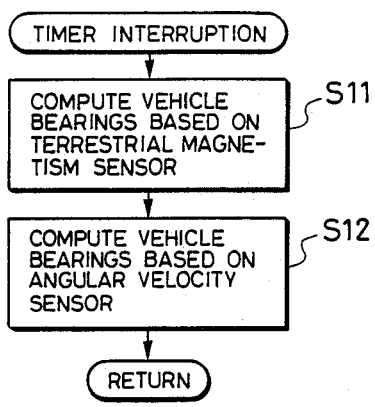

As shown in FIG. 3, the CPU 7 also allows timer interruption to compute the bearings of the vehicle at all times based on each of the output data of the terrestrial magnetism sensor 1 and the angular velocity sensor 2 at predetermined intervals (STEPS S11, S12).

The terrestrial magnetism sensor 1 generally is composed of a pair of magnetic detection sensors arranged apart from each other at a phase angle of 90° on the same plane. One of them is designed to detect the terrestrial magnetic component in the direction of, e.g., U (north), the other being designed to detect another in the direction of V (east). If the terrestrial magnetism sensor 1 is caused to make a turn on the horizontal plane, a circular locus 1 is drawn by the output data of the U and V detecting elements with the origin O of the crossing U, V coordinate axes as its center. Accordingly, a clockwise azimuth $\theta$ formed with the north (U-axis) at the point P ($U_1$, $V_1$), for instance, can be obtained from the following equation:

$$\theta = \tan^{-1}(U/V) \quad (1)$$

Consequently, by mounting the terrestrial magnetism sensor 1 on the vehicle at a predetermined angle with respect to the longitudinal or transverse direction of the vehicle and computing the output data of both the U and V detecting elements in accordance with the Eq. (1), the bearing of the vehicle can be determined.

Figure 4:
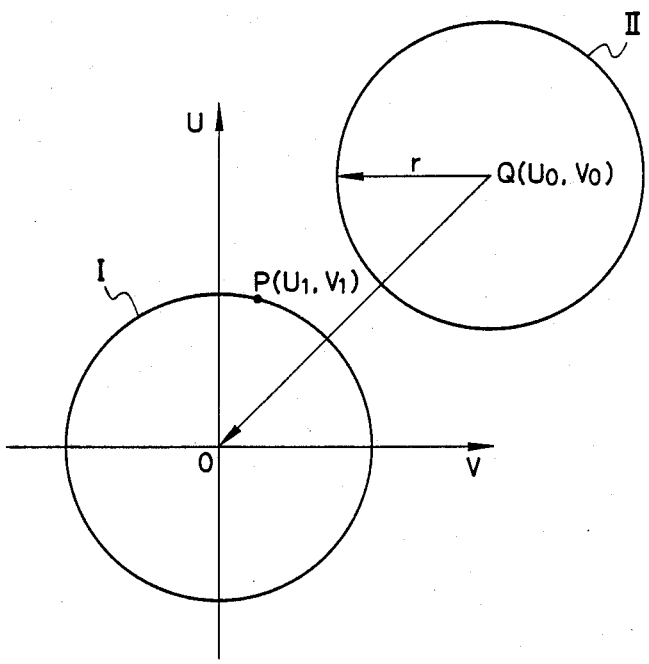
FIG. 4 is a diagram showing a locus configured by the output data of a terrestrial magnetism sensor.

Although ideally only the magnetic flux of the magnetic field of earth should exist around the terrestrial magnetism sensor 1, there normally also is present a magnetic flux originating from the magnetizing properties of the steel body of the vehicle. In order to eliminate the influence of the magnetizing properties of the vehicle body and to detect the vehicles bearing accurately, e.g., Japanese Patent Application (OPI) No. 28208/82 discloses a method in which it is taken into consideration that the distance between the center of a circle obtained by plotting the output obtained by turning a magnetism detecting element and the origin of the coordinate axes is influenced by the magnetic properties of the vehicle's body, provided the U, V magnetism detecting elements are fixed to the vehicle to nullify the relative displacement therebetween. In this case, the output data obtained from both detecting elements are corrected so that the center of the circle thus drawn is caused to move the origin, whereby the influence of the magnetic properties of the vehicle's body is eliminated. As described in detail below, the center of the circle defined by the outputs of the detecting elements is, as shown in FIG. 4 at II, located at a position shifted from the origin. Therefore, the maximum values $U_{max}$, $V_{max}$ and the minimum values $U_{min}$, $V_{min}$ of the outputs U, V Of the two detecting elements are obtained to compute the coordinates of the center 0 in accordance with the following equation (2):

$$U_o = (U_{max} + U_{min})/2$$

$$V_o = (V_{max} + V_{min})/2 \quad (2)$$

The values $U_o$, $V_o$ thus computed are used in the following equation (3) to correct the output values U, V of the magnetism detecting elements. The bearing is computed from the values U', V' thus corrected.

$$U' = U - U_o$$

$$V' = V - V_o \quad (3)$$

Figure 5:
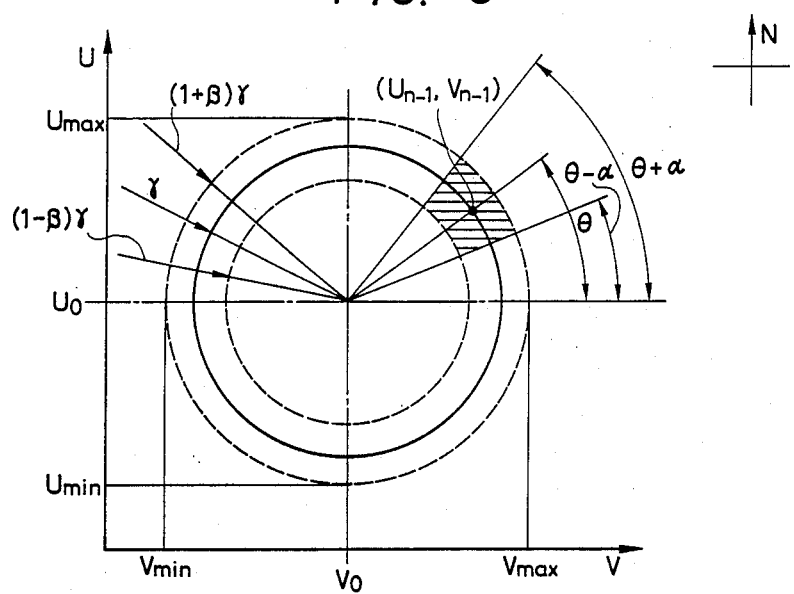
FIG. 5 is a diagram with a window set up on the locus configured by the output data of the terrestrial magnetism sensor.

To increase the reliability of the output data of the terrestrial magnetism sensor 1, an allowable range of fluctuation (window) in the output of the terrestrial magnetism sensor 1 is established. More specifically, as shown in FIG. 5 by a hatched area, the window is set up in an angular direction based on azimuth data ($U_{n-1}$, $V_{n-1}$) previously obtained. The difference between the azimuth data previously obtained and the present data is obtained. When the difference is large, that is, when the present data it is outside the window, the data is considered as erroneous and is replaced with the previous data or the mean value of several (the number of detection times is optional) previous data to further increase the reliability of the output data of the terrestrial magnetism sensor 1. In addition, since the data obtained from the output of the terrestrial magnetism sensor 1 mathematically conforms to an equation of a circle, any data not falling on the circle can be judged an error. However, the actual data tends to vary somewhat because of errors in A/D conversion, etc., and therefore the window is set in such a manner as to have a substantial allowance in the radial direction. In FIG. 5, $\alpha$ and $\beta$ designate an allowable angle and an allowable radius, respectively.

The difference between bearings varies with the time interval employed for obtaining the azimuth data, and accordingly the bearing may be obtained from the relation between the angular velocity and the vehicle speed. Assuming the maximum angular velocity is 30 degrees/sec and the vehicle speed is 40 km/hr, output data of the terrestrial magnetism sensor exceeding the above range is considered erroneous and it is replaced with the previous data or the mean value of several proceeding data. When the window is set with an angle, the angle may be varied as the vehicle speed changes. The angle does not vary with vehicular speed in accordance with a linear function, the relationship is hysteretic. Hence, the allowable angle changes as the speed changes.

On the other hand, the angular velocity sensor normally produces data proportional to the angular velocity around the sensing shaft of the sensor. Due to timer interruption, the CPU 7 integrates the output data of the angular velocity sensor with respect to time and obtains the present bearing by computing the bearing change from the angular velocity. The CPU 7 first treats the data produced by the angular velocity sensor 2 when the angular velocity is zero as the center value $G_{dc}$ of the sensor output and obtained the displacement on the basis of the center value $G_{dc}$ to obtain the bearing by integrating it with respect of time. However, temperature changes may cause the center value $G_{dc}$ to fluctuate. If the center value $G_{dc}$ changes, the resulting error will cause a drift of the computed bearing, and thus the bearing obtained by the angular velocity sensor 2 must be corrected. Moreover, because of the characteristics of the circuit (e.g., operational amplifier) used for detecting the data from the angular velocity sensor, the angle of rotation may not be 90° even though the vehicle has actually turned in a 90-degree arc. For this reason, there must be employed a coefficient of correction for correcting the error. When the coefficient of correction is obtained, however, an additional error will occur unless the obtained angle of rotation of the vehicle is accurate.

Referring to flowcharts of FIGS. 8A to 8C, vehicle bearing detection procedures executed by the CPU 7 will subsequently be described.

The CPU 7 first determines whether a so-called one-turn correction has been completed (STEP S20). If it is not yet completed, the CPU 7 executes a one-turn correction routine (STEP S21). In the one-turn correction routine, the vehicle loaded with the terrestrial magnetism sensor 1 is turned once to obtain $U_o$, $V_o$ (center value) and a radial value r. The values thus obtained are stored in the RAM 9.

Subsequently, an initial bearing is set up (STEP S22). The vehicle stays motionless while its engine is started so that the bearing of the vehicle remains constant. After the initial bearing is set up, the output data of the terrestrial magnetism sensor 1 is read sequentially into a ring buffer of the RAM 9 (STEP S23). The amount of data stored in the ring buffer can be equivalent to what is required for a desired length of time. Then CPU 7 decides whether the output data is within the window (the hatched of FIG. 5) (STEP S24). If it is contained in the window, the bearing of the vehicle is computed in accordance with the Eqs. (1) to (3) using the output data obtained from the terrestrial magnetism sensor 1 (STEP S25). The count N of a window error counter for counting the number of times the output data of the terrestrial magnetism sensor 1 is outside the window and the count E of a center shift decision counter for counting the number of times the center shifts are both reset (STEP S26) and a flag indicating no window error is set (STEP S27). Thus, in normal operation, the output data of the terrestrial magnetism sensor 1 will always be within the window when no extraneous magnetic field is present.

The procedure for determining the bearing is as follows: The CPU 7 first checks if a flag for prohibiting the use of map bearing is "0" and decides whether the bearing (map bearing) obtained from the map data stored on the recording medium 10 in STEP S40 is utilizable. (A description will be given below of a method of determining if it is possible to utilize the map bearing.) If the use of the map bearing is not allowed, the CPU 7 sets the bearing previously obtained (STEP S41), and then returns to STEP S23. If the utilization of the map bearing is admitted, the CPU 7 further decides whether a flag designating an error-free window is set to thus determine whether the output data of the terrestrial magnetism sensor 1 is within the window (STEP S42). If an error is detected, the CPU 7 utilizes the same map bearing (STEP S43), and then returns to STEP S23. If no error is detected in the window, the CPU 7 decides whether the difference between the bearing obtained from the output data of the terrestrial magnetism sensor 1 and the map bearing exceeds a predetermined value (STEP S44), and, if it does exceed the predetermined value, prohibits the use of the map bearing (STEP S46), and then uses the bearing obtained from the output data of the terrestrial magnetism sensor 1 (STEP S47). If the difference is less than the predetermined value, the CPU 7 utilizes the map bearing as it is (STEP S45) and returns to STEP S23.

On the other hand, if the output data of the terrestrial magnetism sensor 1 is not within the window, the count N of the window error counter is incremented by only one (STEP S28) and the CPU 7 decides whether the count N has reached the maximum window error value $N_{max}$ (STEP S29). The CPU 7 deems the output data of the terrestrial magnetism sensor 1 received at this time as erroneous until it reaches the maximum window error value, utilizes the bearing obtained on the basis of the previous value obtained from the output data of the terrestrial magnetism sensor 1 or the mean value of several proceeding output data thereof (STEP S30), sets the flag designating the existence of a window error (STEP S31), and then proceeds to STEP S40.

If the count N of the window error counter reaches the maximum window error value $N_{max}$, the CPU 7 increments the count E of the center shift counter by "1" only (STEP S32), and decides whether the count E has reached the maximum center shift decision value Emax (STEP S33).

The CPU 7 sets a timer which is activated at a fixed time intervals until the maximum center shift decision value $E_{max}$ is reached (STEP S34), receives the output data of the terrestrial magnetism sensor 1 (STEP S36) until time-out occurs (STEP S35) and computes the bearing based on the received data (STEP S37). That is, if the output data of the terrestrial magnetism sensor 1 does not fall within the window within a designated length of time, the CPU 7 tentatively sets the window anew and refrains from processing the error for a fixed time length. For this processing, the CPU 7 is capable of handling non-standarized data even if the steering wheel is abruptly turned.

Subsequently, the CPU 7 determines whether the present map bearing is utilizable, as in the case of STEP S40 (STEP S48). If utilization of the map bearing is not permissible, the CPU 7 employs the map bearing previously obtained (STEP S49) and, if it is permissible, employs the map bearing as it is (STEP S50), then returns to STEP S35.

Figure 9:
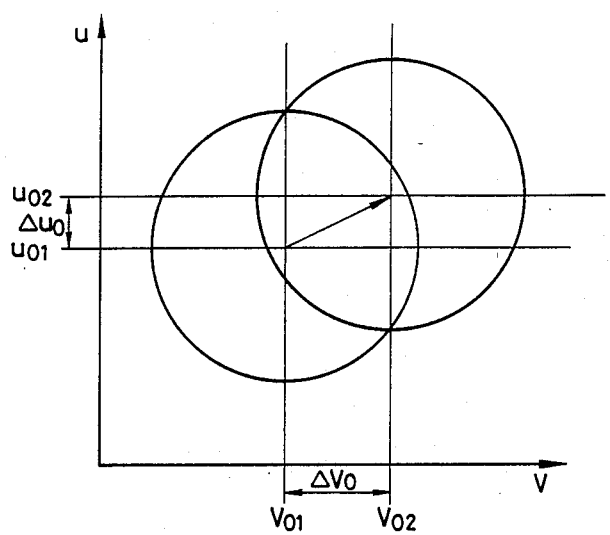
FIG. 9 is a diagram showing a state in which the locus configured by the output data of the terrestrial magnetism, sensor shifts with respect to its center value.

If the count E of the center shift counter reaches the maximum center shift decision value $E_{max}$, the CPU 7 decides that the center value has shifted in STEP S33, corrects the center shift by utilizing other data (STEP S38), reduces both the count N of the window error counter and the count E of the center value shift decision counter (STEP S39) and returns to STEP S23. If the vehicle passes a railroad crossing, for example, the geomagnetic field may be almost entirely blocked, or in the presence of a strong extraneous magnetic field, the output data of the terrestrial sensor 1 will be deprived of its DC component. The center thus shifted, as shown in FIG. 9, makes it impossible for the CPU 7 to obtain a proper bearing. If, for example, the vehicle's body is slightly magnetized by an extraneous field and the center caused to shift, the output data of the terrestrial magnetism sensor 1 will never enter the window. The CPU 7 senses such a situation by counting the number of times the output data is not allowed to enter the window. When the above situation occurs, only the origin of the coordinates of the equation of the circle changes even though the output data of the terrestrial magnetism sensor 1 has a disturbed DC component, and its radius r will not change (unless the strength of the terrestrial magnetism again changes). Accordingly, the true origin of the coordinates can be obtained by utilizing other pieces of data and the shifted center corrected.

When the shifted center is corrected, e.g., the output data of the angular velocity sensor 2 can be employed. Although the absolute value is unobtainable by the angular velocity sensor 2, the desired angle can be obtained by integrating its output data with respect to time. The value known while the center value is shifted includes the output data (U, V) of the terrestrial magnetism sensor 1, the radius r obtained by correcting for one turn, and the output data of the angular velocity sensor 2. These values have the following relationship:

$$U = r \cdot \sin \theta + U_o$$
$$V = r \cdot \cos \theta + V_o \quad (4)$$

Eq. (4) can be transformed into Eq. (5) as follows:

$$U_o = U - r \cdot \sin \theta$$
$$V_o = V - r \cdot \cos \theta \quad (5)$$

From Eq. (5), the present center value $(U_o, V_o)$ can thus be obtained.

As another method of obtaining the angle 74, there may be employed a method of computing the angle of the road on which the vehicle is traveling and using that angle as the angle $\theta$. That is, the road is expressed by a segment of a line connecting two points and each point is converted into a numerical value and stored on the recording medium 10 as map data, from which the values at both ends of the segment locating the vehicle are determined. Therefore, the angle $\theta$ can be obtained by computing the slope of a line connecting those two points.

A description will further be given of a method of determining whether the map bearing is utilizable.

On receiving a "traveling" pulse from a traveling distance sensor for detecting the distance covered b the vehicle and its speed, the CPU 7 allows traveling pulse interruption. In the traveling pulse interruption process, an error resulting from the detection of the traveling distance sensor 3 and another from the digitization of the map data are detected according to the map data each time the vehicle covers a fixed distance. A location separated by that distance from what has previously been detected is set as the present location, so that the present vehicle location can be recognized accurately. A specific method of recognizing the present location has already been disclosed in the present applicants' Japanese Patent Application No. 156883/86.

In the process of determining the present location, an operation is employed of finding the road closest to the present location from the map data each time the vehicle covers a fixed distance and determining the present location on that road. At this time, the CPU 7 also performs the traveling pulse interruption process shown in FIG. 10. More specifically, the CPU 7 first decides whether the present location is recognized (STEP S51). If the present location is not recognized, there may be a case where no road closest to the present location is obtainable from the map data. In such a case, the flag "1" for prohibiting the use of the map bearings is set, i.e., utilization of the map bearings is prohibited (STEP S52) in order to terminate the process. While this process of determining the present location is performed (i.e., the present location is recognized in step S41), the CPU 7 decides whether the vehicle speed exceeds a predetermined speed of $S_{mt}$ (STEP S53). If the vehicle speed is less than the predetermined speed $S_{mt}$, the CPU 7 proceeds to STEP S52, while it terminates the process if the speed remains over the predetermined speed $S_{mt}$.

On sensing the timer interruption, the CPU 7 checks whether the flag prohibiting the use of the map bearings is "1", that is, whether the use of the map bearings is prohibited (STEP S54) and, if the prohibition is effected, the CPU 7 monitors until a predetermined time lapses (STEP S55). After the predetermined time lapses, the CPU 7 sets the flag for prohibiting the use of the map bearings to "0" and permits the use of the map bearings (STEP S56) and also terminates the procedure without effecting any other process, provided the use of the map bearings has been permitted.

In the above method of detecting the bearing of a vehicle, the bearing of the vehicle does not change greatly so far as the vehicle travels at a predetermined speed (e.g., 40 km/hr) and possible errors are reduced during map data production. The reliability of the bearing obtained from the map data is appreciably higher than what is obtained from the terrestrial magnetism sensor 1. When the present vehicle location is recognized while the vehicle is traveling at a speed higher than the predetermined speed, the process of determining the present location from the map data is employed and the bearing obtained from the terrestrial magnetism sensor 1 is not employed. The bearing of the vehicle can thus be detected accurately.

Figure 11:
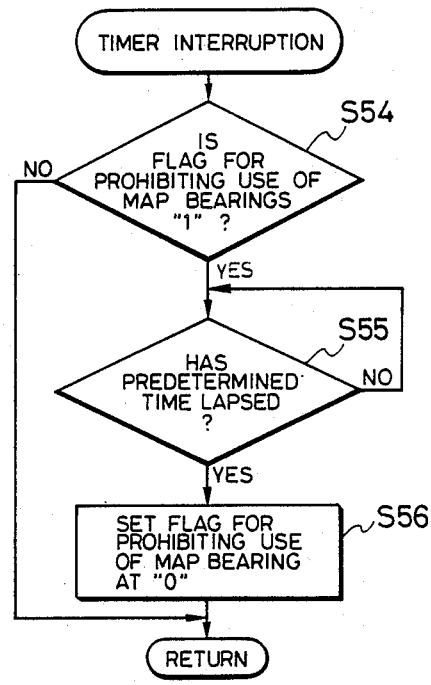
FIG. 11 is a flowchart showing a procedure for timer interruption.

In STEP S55 in FIG. 11, although a time lapse is monitored, it is also possible to monitor whether the vehicle has covered a predetermined distance.

Figure 12:
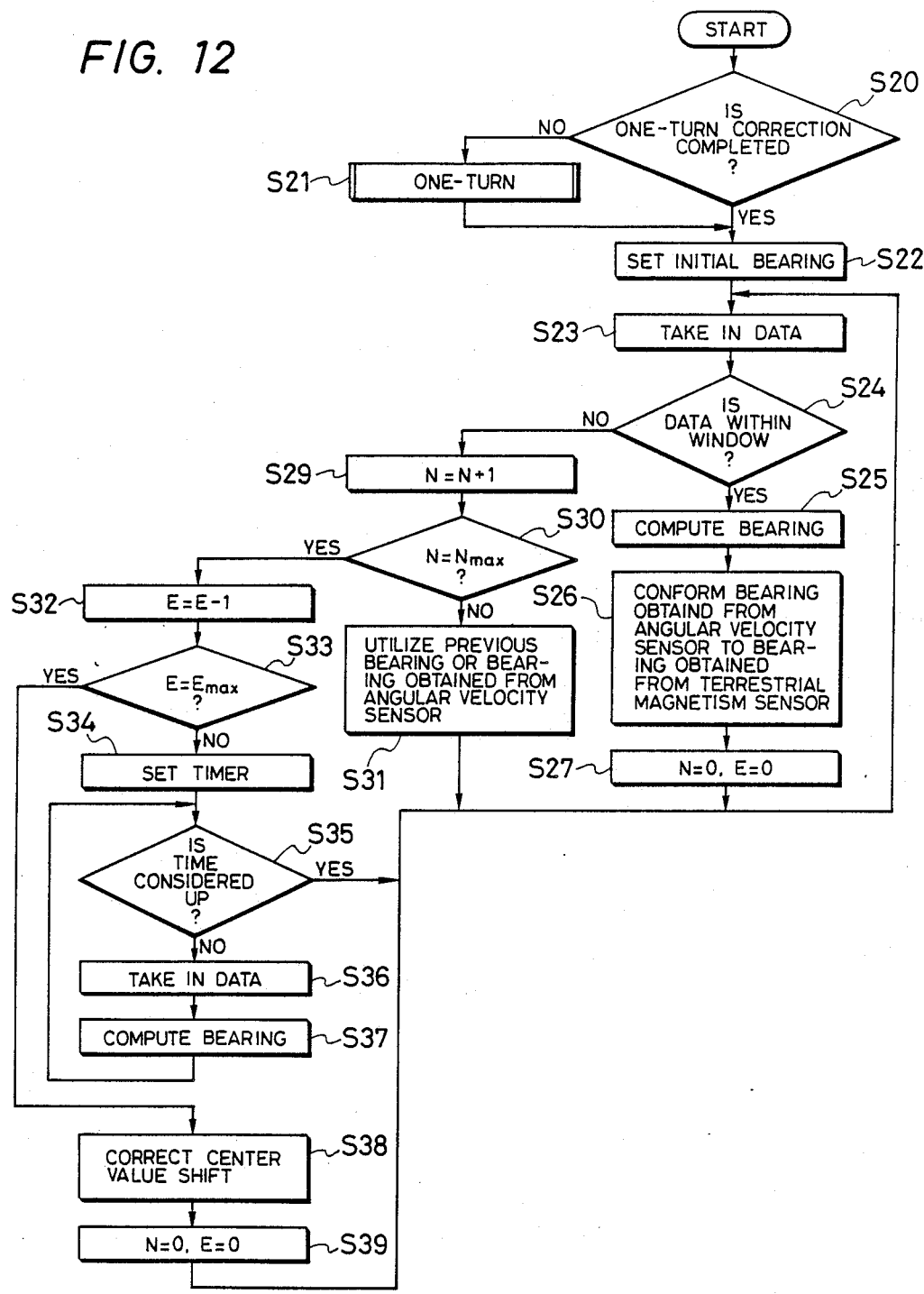
FIG. 12 is a flowchart showing a vehicle bearing detection procedure executed by the CPU of FIG. 1.

Referring to the flowchart of FIG. 12, a vehicle bearing detection procedure executed by the CPU 7 of FIG. 1 in another embodiment of the present invention will subsequently be described.

Figure 8A:
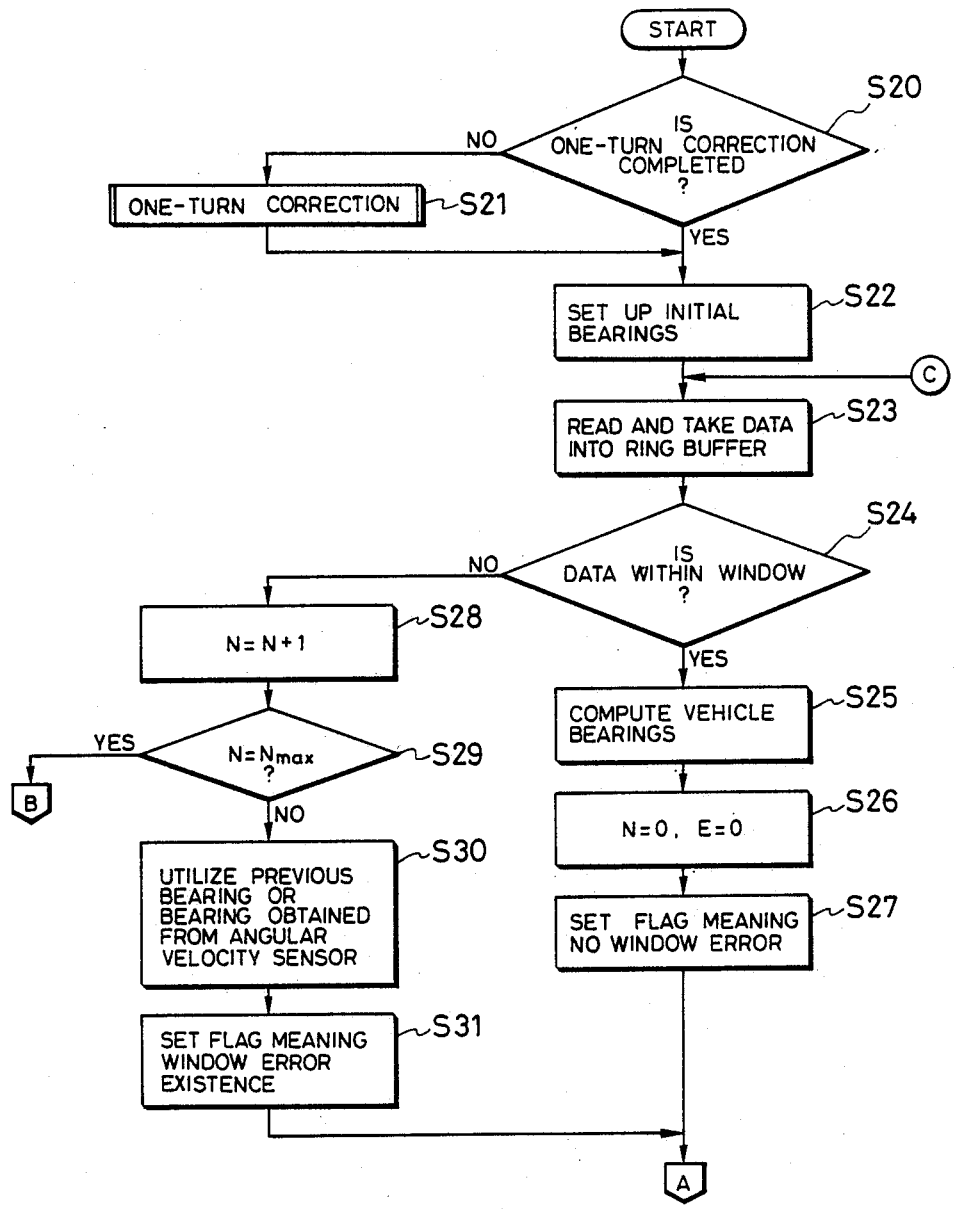
FIGS. 8A to 8C are flowcharts illustrating vehicle bearing detection procedures executed by the CPU in FIG. 1 according to the present invention.
Figure 8B:
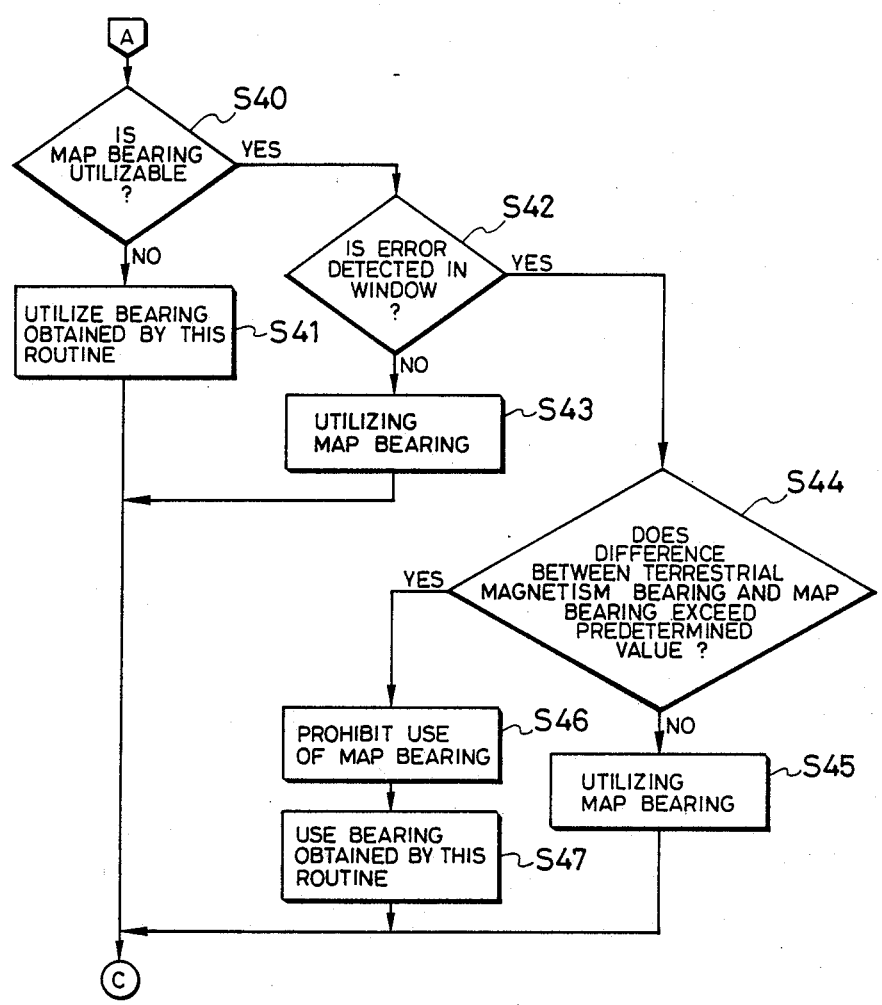
Figure 8C:
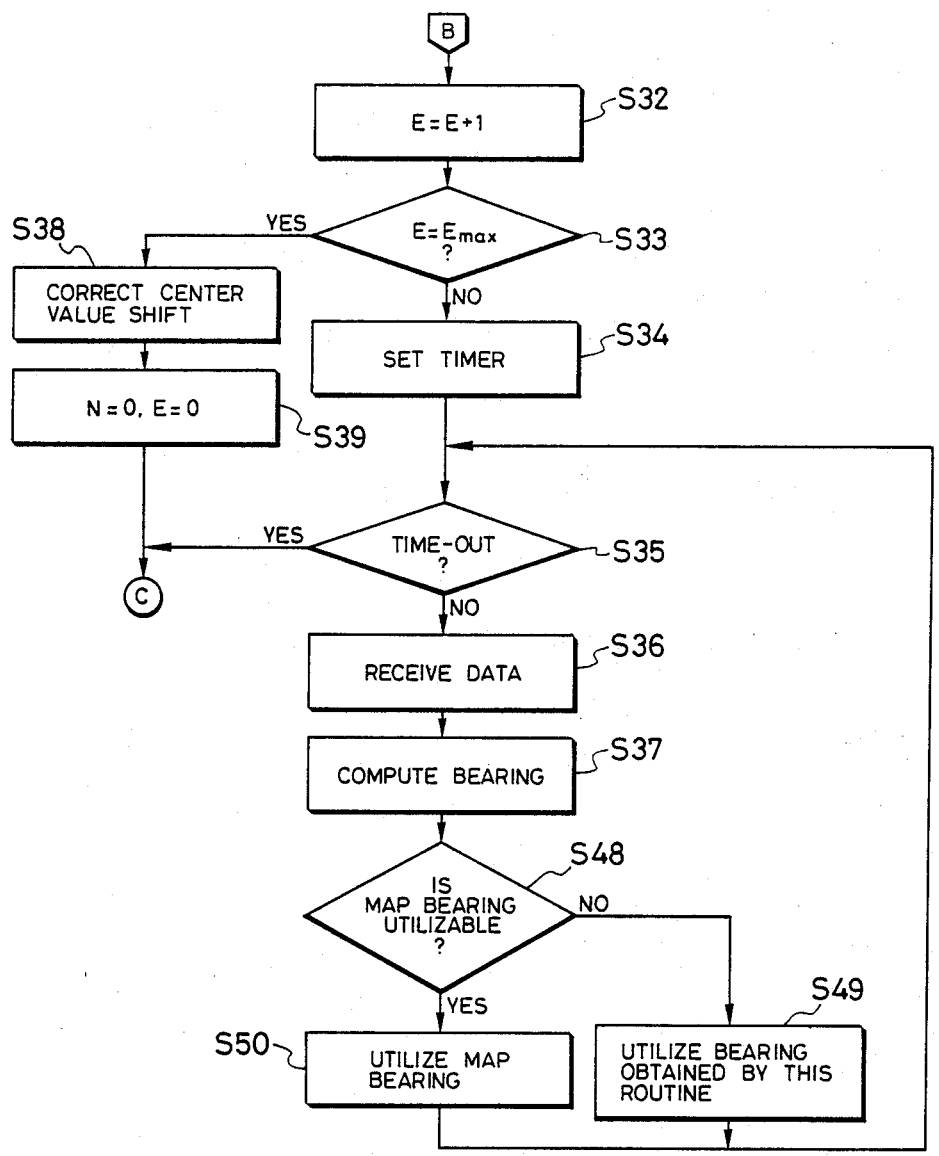

The STEPS S20 through S22 are implemented in the same manner as described in FIG. 8A. In STEP S22, the output data of the terrestrial magnetism sensor is received (STEP S22) after the initial bearing is set in STEP S22 and the CPU 7 decides whether the output data (the hatched portion shown in FIG. 5) is within the window (STEP S24). If the data is within the window, the CPU 7 computes the bearing of the vehicle from the output data of the terrestrial magnetism sensor thus received on the basis of Eqs. (1) to (3) (STEP S22). The bearing thus computed represents STEP S6 in the flowchart of FIG. 2 and is, together with the map, displayed on the display 12. In addition, the bearing obtained from the output data of the angular velocity sensor is made to conform to that obtained from the terrestrial magnetism sensor 1 (STEP S26).

Subsequently the CPU 7 conforms the count N of the window error counter for counting the number of times the output data of the terrestrial magnetism sensor 1 is outside the window to the count E of the center shift decision counter for counting the number of times the center shifts occur are both reduced to zero (STEP S27) and then returns to STEP S23. The above steps are employed when the output data of the terrestrial magnetism sensor 1 remains within the window and there is no disturbance magnetic field.

If the output data of the terrestrial magnetism sensor 1 is outside the window, on the other hand, the CPU 7 increments the count N of the window error counter by one (STEP S29) and decides whether the count N has reached the maximum window error value $N_{max}$ (STEP S30). Until the count N reaches the maximum window error value $N_{max}$, the CPU 7 regards the output data of the terrestrial magnetism sensor as erroneous, utilizes the bearing obtained from the previous value of the output data of the terrestrial magnetism sensor 1 or the mean value of the several different preceeding data (STEP S31) and returns to STEP S23.

If the count N of the window error counter reaches the maximum window error value $N_{max}$, the CPU 7 increments the count E Of the center Shift counter by one (STEP S32) and decides whether the count E has reached the maximum center shift decision value $E_{max}$ (STEP S33). Until the count E reaches the maximum center shift decision value $E_{max}$, the CPU 7 sets the timer to be activated at a fixed time interval (STEP S34), receives the output data of the terrestrial magnetism sensor 1 until the counted-out time is up in STEP S35 (STEP S36), and computes the bearing based on the received data (STEP S37). That is, unless the output data of the terrestrial magnetic sensor 1 is within the window for a fixed interval of time, the CPU 7 temporarily refrains from processing the error for a fixed time interval. For this processing, the CPU 7 is capable of coping with a case where data outside the standard has been generated by a quick turn.

As set forth above, because the reliability of the bearing obtained from the output data of the terrestrial magnetism sensor 1 outside the window is undependable, the bearing obtained from the output data of the angular velocity sensor is left as it is.

When the count E of the center shift counter reaches the maximum center shift decision value $E_{max}$, the CPU 7 decides that the center has shifted, corrects the center thus shifted by utilizing other data (STEP S38), reduces the count N of the window error counter and the count E of the center shift decision counter both to zero (STEP S39), and then returns to STEP S23. If the vehicle passes a railroad crossing, for example, the vehicle body can be slightly magnetized by a strong magnetic field there present. Consequently, the DC component of the output data of the terrestrial magnetism sensor 1 may be strongly affected, causing the center to be shifted as shown in FIG. 9. The CPU 7 is unable to obtained the bearing accurately thereafter.

In case the magnetized vehicle body causes the center value to shift, the output data of the terrestrial magnetism sensor 1 is prevented from being inside the window and, by counting the number of times that the output data is kept outside the window for a fixed length of time, the CPU 7 is capable of determining the occurrence of the above situation. When such a situation occurs, only the origin of the coordinate axis of the equation of the circle changes, although the output data of the terrestrial magnetism sensor 1 contains a DC component. The radius r does not change (unless the strength of the terrestrial magnetism changes). Consequently, other kinds of data can be utilized to obtained the origin of the coordinates and thus correct the shifted center.

In the process of correcting the center thus shifted, the Eq. (5) may be used to obtain the present center value $(U_o, V_o)$ as in the case of the first embodiment and the angle $\theta$.

Figure 10:
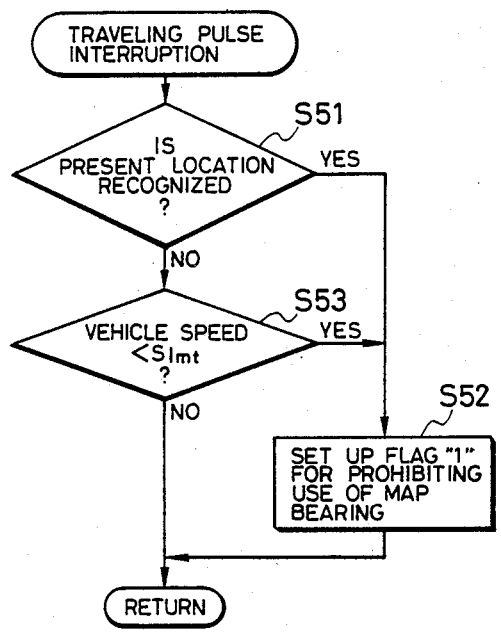
FIG. 10 is a flowchart showing a procedure for traveling pulse interruption.
Figure 13:
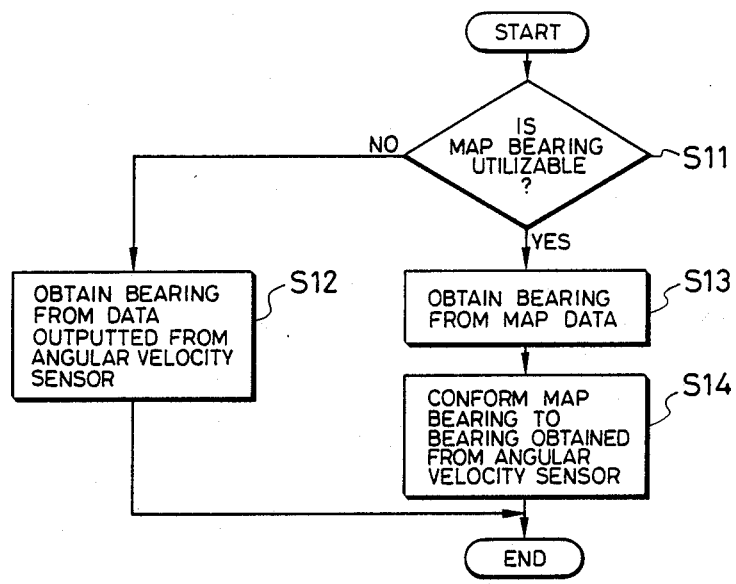
FIG. 13 is a flowchart showing a vehicle bearing detection procedure executed by the CPU of FIG. 1.

Subsequently, description will be given of a third procedure for detecting the bearing of a vehicle with reference to FIG. 13, together with FIGS. 10 and 11 shown separately.

According to the main program, the CPU 7 decides whether the bearing obtained from the map data stored on the recording medium 10 is utilizable to decide whether a flag (described later) for prohibiting the use of map bearings is "0" (STEP S11). The CPU 7 decides whether the map bearing is utilizable according to a method described below. If the CPU 7 decides that utilization is impossible, it obtains the present vehicle location by integrating the output data of the angular velocity sensor 2 with respect to time (STEP S12). If the CPU 7 decides that the map bearing is utilizable, it obtains bearing data from the map data corresponding to the road on which the vehicle is traveling (STEP S13) and, by replacing the bearing data obtained from the angular velocity sensor 2 with the above bearing data, conforms the bearing obtained from the angular velocity sensor 2 to that obtained from the map data (STEP S14).

The road on which the vehicle is traveling is expressed by a series of line segments connecting two points, each point being stored on the recording medium in the form of numerical value as map data, and the bearing of the vehicle can be obtained therefrom by computing the slope of the segments.

In the determination of the present vehicle location, the CPU 7 selects the road closest to the present location from the map data each time the vehicle has covered a fixed distance. At this time, the CPU 7 simultaneously carries out the traveling pulse interruption as shown in FIG. 10.

Moreover, the CPU 7 also carries out timer interruption shown in FIG. 11.

More specifically, because any segment on the map is judged linearly approximated in the method of detecting the bearing of a vehicle while it is traveling at a speed higher than the predetermined speed (e.g., 40 kg/hr), irrespective of the vehicle bearing, error is hardly produced in the map digitization. The reliability of the bearing obtained from the map data is higher than that obtained from the angular velocity sensor 2, so that the bearing obtained from the angular velocity sensor is corrected, when the present location of the vehicle traveling at a speed higher than the predetermined one, by conforming the bearing obtained from the output data of the angular velocity sensor to that obtained from the map data. Consequently, the reliability of the bearing obtained from the angular velocity sensor 2 can be increased.

Figure 14:
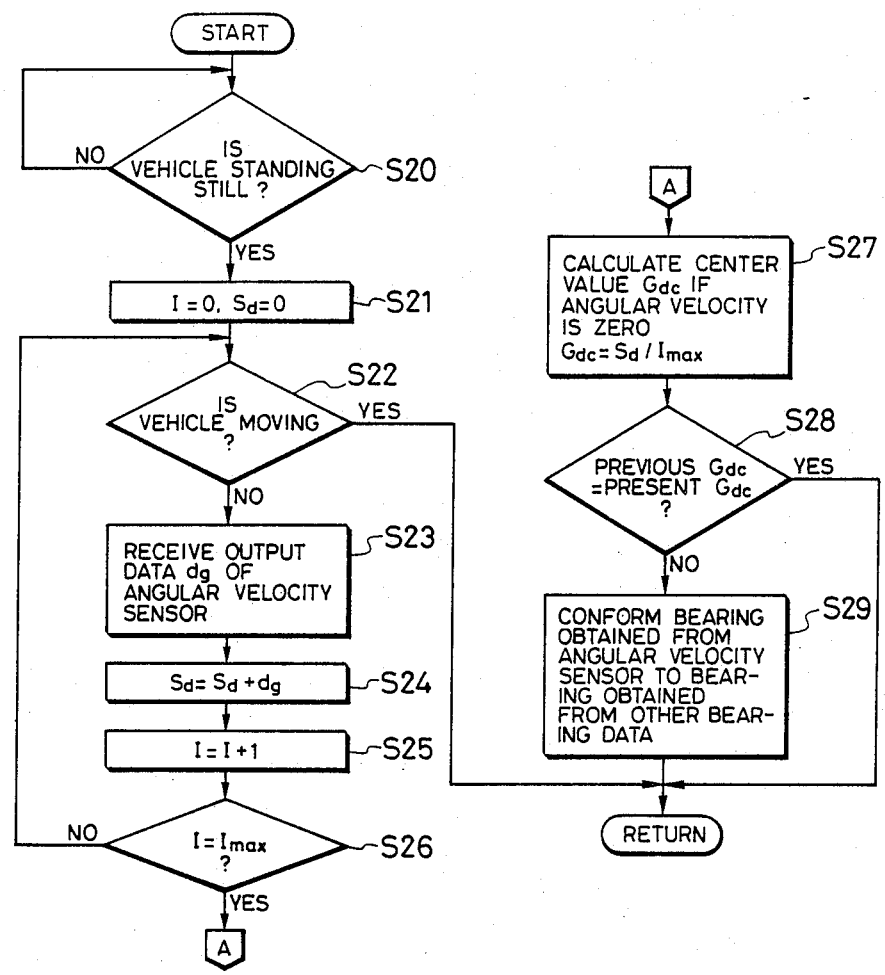
FIG. 14 is a flowchart showing a vehicle bearing detection procedure executed by the CPU of FIG. 1.

Referring to a flowchart of FIG. 14, a description will subsequently be given of a vehicle bearing detection method implemented by the CPU 7 according to a fourth embodiment of the present invention.

The CPU 7 first decides whether the vehicle is standing still (STEP S20). If the vehicle is not at a standstill, the decision of the CPU 7 remains unchanged until it decides that the vehicle has stopped moving. When the CPU 7 decides that the vehicle is standing still, it sets a data counter I and a register $S_d$ for obtaining the sum of data at 0 (STEP S21) and subsequently monitors the movement of the vehicle (STEP S22). In this case, if the vehicle starts moving before a predetermined number of data (corresponding to the maximum value $I_{max}$ as described below) are available, the CPU 7 stops the process.

When the vehicle is standing still, the CPU 7 receives the output data $d_g$ of the angular velocity sensor 2 (STEP S23) and adds the data $d_g$ to the summary register $S_d$ to obtain the mean value (STEP S24). The reason for obtaining the mean value of the output data $d_g$ of the angular velocity sensor is to prevent vibration of the vehicle and the error resulting from A/D conversion from affecting the data. Then, the CPU 7 increments the count of the data counter I by one (STEP S25) and decides whether the count 1 has reached the maximum value $I_{max}$ (STEP S26). If the count has not reached the maximum value $I_{max}$, the CPU 7 returns to STEP S22 and repeats the process. If the count reaches the maximum value $I_{max}$, the CPU 7 obtains the mean value by dividing the sum $S_d$ of the data by the maximum value $I_{max}$ and sets the mean value as the Center value $G_{dc}$ of the sensor output (STEP S27). The CPU 7 decides whether the center value $G_{dc}$ is equal to the previous value of $G_{dc}$ (STEP S28) and takes no action if the two values coincide. If the two values are different, the CPU 7 replaces the bearing obtained from the angular velocity sensor 2 through computation, which is deemed unreliable, with, e.g., the bearing obtained from the terrestrial magnetism sensor 1 or the map data, thereby conforming the desired data to that obtained from the angular velocity sensor 2 (STEP S29).

In case of drift of the bearing data obtained from the angular velocity sensor, that bearing data can be corrected through a series of the aforesaid operations, and the reliability of the bearing obtained from the angular velocity sensor 2 is thus improved.

Figure 15:
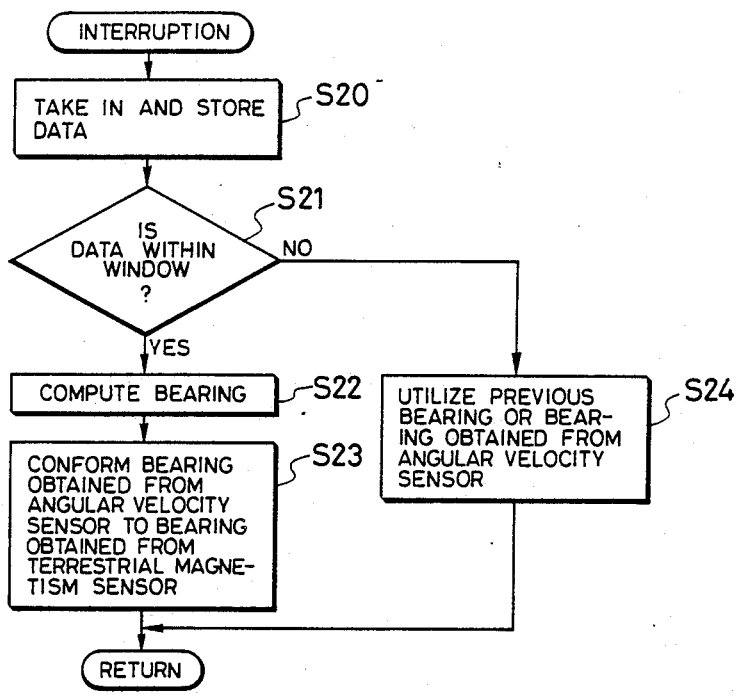

Referring to the flowcharts of FIGS. 15 and 16, a description will be given of procedures executed by the CPU 7 for processing data from the terrestrial magnetism sensor according to a fifth embodiment.

The CPU 7 allows the interruption process of FIG. 6 each time a unit distance or time is covered by the vehicle. That is, the CPU 7 receives the output data U, V of the terrestrial magnetism sensor 1 and the output data G of the angular velocity sensor 2, saves each of the data in a designated position in the memory (RAM 9), updates the pointer and the counter (STEP S20), and then decides whether the output data of the terrestrial magnetism sensor 1 is within the window (STEP S21). If the output data is within the window, the CPU 7 computes the bearing of the vehicle using the output data of the terrestrial magnetism sensor 1 thus received in accordance with Eqs. (1) to (3) (STEP S22). The bearing thus computed, together with the map involved, is displayed on the display in STEP S6 using the process of the flowchart of FIG. 2. Provided the bearing data obtained from the terrestrial magnetism sensor is within the window, the CPU 7 deems the data reliable and conforms the bearing obtained from the output data of the angular velocity sensor to that obtained from the output data of the terrestrial magnetism sensor 1 (STEP S23). The bearing obtained from the angular velocity sensor 2 can thus always be made equally reliable to what is obtained from the terrestrial magnetism sensor 1. On the other hand, if the output data of the terrestrial magnetism sensor 1 is located outside the window, the CPU 7 utilizes the bearing previously obtained or that obtained from the output data of the auxiliary bearing sensor of the angular velocity sensor 2 (STEP S24).

FIG. 16 shows a routine for examining the correlation between the data of the terrestrial magnetism sensor 1 and the angular velocity sensor 2 and for correcting the output data of the terrestrial magnetism sensor 1. This routine is called and executed at fixed time or distance intervals.

The CPU 7 first decides whether the vehicle has covered a unit distance from the previously examined position, i.e., whether data for use in determining the distance is available (STEP S30). On deciding that the data has been prepared, the CPU 7 computes the data for examination using raw data U, V and G from the terrestrial magnetism sensor 1 and the angular velocity sensor 2 (STEP S31). In that computation, the output data of the angular velocity sensor 2 is converted into coordinates X, Y in the following equations by the use of the center values $U_o$, $V_o$ of the output data of the terrestrial magnetism sensor 1 and the radius r of the circle:

$$G_x = r \cdot \cos(G) + V_o$$

$$G_y = r \cdot \sin(G) + U_o$$

Figure 17:
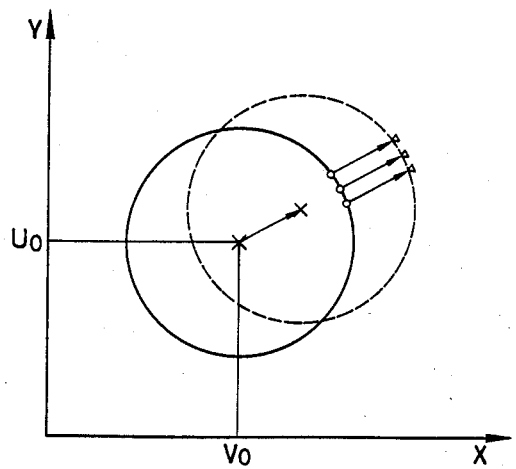
FIG. 17 is a diagram showing a state in which the locus configured by the output data of the terrestrial magnetism sensor shifts with respect to its center value.

Accordingly, the output data of the angular velocity sensor is converted into the coordinates of the output data of the terrestrial magnetism sensor 1. Under normal conditions, $U = G_y$, $V = G_x$. If the vehicle body is magnetized, the output data of the terrestrial magnetism sensor 1 is distributed on the circumference of the circle having the radius r, the circle being moved horizontally by a magnetizing vector as shown in FIG. 17. For this reason, ordinary data processing would lead to the computation of an incorrect bearing.

In the next STEP S32, consequently, the standard deviation $\sigma_u$ of displacement $X_d(i) = V(i) - G_x(i)$ in the direction of X axis and the mean value $X_{dm}$ are obtained with respect to the data of predetermined n sets of samples. The CPU 7 then compares the standard deviation ou with a preset value oth (STEP S33) and, if the data is within the range of the set value $\sigma_{th}$, the CPU 7 decides whether a newly estimated value Von of $V_o$ obtained from calculating the expression $V_{on} = V_o + V_{dm}$ is within the set range (STEP S34). That range is set so that no effect of magnetization is present.

When the CPU 7 decides that the data is within the set range in STEP S34, it then proceeds to STEP S35. In STEP S35, the standard deviation $\sigma_v$ of displacement $Y_d(i) = U(i) - G_y(i)$ in the direction of the Y axis and the mean value $Y_{dm}$ are Obtained. The CPU 7 then compares the standard deviation ov with the preset value $\sigma_o$th (STEP S36) and, if the data is within the range of the set value $\sigma_{th}$, it decides whether a newly estimated value $U_{on}$ of $U_o$ obtained from calculating the expression $U_{on} = U_o + Y_{dm}$ is within the set range (STEP S37).

If the CPU 7 decides that the data is within the set range in STEP S37, it further decides whether the mean values $X_{dm}$ and $Y_{dm}$ are within the set window (STEP S38). If they are contained in that window, the CPU 7 decides that the magnetic field has been disturbed temporarily because the output data of the terrestrial magnetism sensor 1 is slightly shifted, and does not change the center values $U_o$, $V_o$. If they are located outside the window, the CPU 7 further changes the center values $U_o$, $V_o$ to the estimated values $U_{on}$, $V_{on}$ (STEP S39). Thereafter the updated values $U_o$, $V_o$ are used to compute the bearing of the vehicle.

Since the aforesaid computations are carried out statistically, precise correction can be made by having the CPU 7 judge whether the data is reliable when the vehicle takes a sharp turn or even though the output data of the terrestrial magnetism sensor 1 is temporarily disturbed by another vehicle traveling in the opposite direction.

Figure 18:
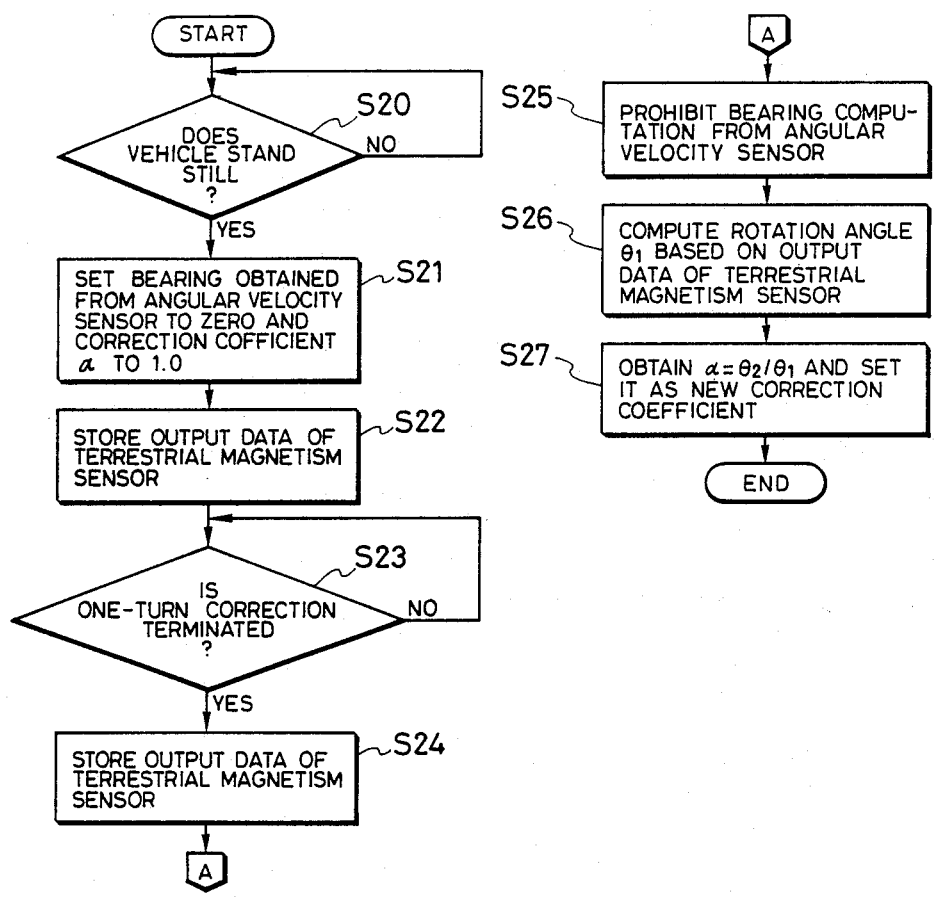
FIG. 18 is a flowchart showing procedures for processing data from the terrestrial magnetism sensor which is to be executed by the CPU of FIG. 1.

Referring to the flowchart of FIG. 18, a description will further be given of a procedure executed by the CPU 7 for processing data from the angular velocity sensor according to a sixth embodiment of the present invention.

The CPU 7 first decides whether the vehicle is standing still (STEP S20). If the vehicle is not at a standstill, the CPU 7 will not change its decision until the vehicle actually has stopped moving. If the vehicle is standing still, the CPU 7 reduces the bearing obtained from the angular velocity sensor to zero and sets a coefficient of correction $\alpha$ for the angular velocity sensor 2 at an initial value ($\alpha = 1.0$) (STEP S21). In so doing, the CPU 7 prevents the bearing data obtained from the angular velocity sensor 2 from being affected by the correction coefficient $\alpha$. Subsequently, the output data of the terrestrial magnetism sensor 1 is prestored in the memory (RAM 9) (STEP S22). Since the influence of the magnetized vehicle body is nullified by turning the vehicle once to make available one-turn correction data for accurate detection of the vehicle's bearing, the CPU 7 waits for the termination of the one-turn correction (STEP S23). As set forth above, the one-turn correction is effected as disclosed in Japanese Patent Application (OPI) No. 28208/82.

At the termination of the one-turn correction, the output data obtained at the termination thereof is stored in the memory (RAM 9) (STEP S24). At this point of time, the CPU 7 prohibits the computation of the bearing from the angular velocity sensor 2 in the routine of FIG. 3 and causes the memory (RAM 9) to store the angle of rotation obtained during the process of bearing computation (STEP S25).

Then the CPU 7 employs the coordinates Uo, Vo of the center Q of the circle II of FIG. 4 obtained from the one-turn correction and obtains the bearing of the vehicle at the very commencement of its movement from the output data of the terrestrial magnetism sensor 1 stored at the commencement thereof in STEP S22. The CPU 7 further obtains the bearing of the vehicle at the termination of its movement from the output data of the terrestrial magnetism sensor 1 stored at termination in STEP S24 and computes the angle of rotation $\theta_1$, of the vehicle during the one-turn correction based on both the bearings (STEP S26). The CPU 7 obtains the ratio ($\theta_1/\theta_2$), i.e., the ratio of the angle of rotation $\theta_2$ derived from the angular velocity sensor 2 to the angle of rotation $\theta_1$, from the terrestrial magnetism sensor 1, the former and the latter being stored in STEP S25, and sets the results of comparison as a new coefficient of correction for the angular velocity sensor 2 (STEP S27).

Thereafter, the CPU 7 employs the coefficient of correction 60 when computing the bearing from the output data of the angular velocity sensor in STEP S12 of FIG. 3 to correct the drift resulting from the characteristics of the electric circuit, whereby accurate detection of the bearing using the angular velocity sensor 2 is obtained.

As set forth above, the method of detecting the bearing of a vehicle according to the present invention is characterized by the steps of employing the bearing obtained from map data, provided there has been implemented a process of recognizing the present vehicle location on the basis of the map data while the vehicle is traveling at a predetermined speed, which not employing the output data of the terrestrial magnetism sensor. Accordingly, it is possible to detect the bearing of the vehicle accurately on the basis of reliable bearing data at all times.

Moreover, the method of detecting the bearing of a vehicle according to the present invention is characterized by steps of setting up a range allowing for the fluctuation of the output data of the terrestrial magnetism sensor and, so far as the output data of the terrestrial magnetism sensor is within that range, conforming the bearing obtained from the output data of the terrestrial magnetism sensor to that obtained from the angular velocity sensor, thereby correcting the bearing obtained from the angular velocity sensor. Accordingly, the bearing of the vehicle can be detected accurately since the drift resulting from the bearing computation is cancelled by the output data of the terrestrial magnetism sensor for detecting the absolute bearing.

The method of detecting the bearing of a vehicle according to the present invention is further characterized by the steps of conforming the bearing obtained from the output data of the angular velocity sensor to the bearing obtained from the map data, provided there the process of recognizing the present vehicle location on the basis of the map data while the vehicle is traveling at a speed higher than a predetermined speed has been carried out. Accordingly, the bearing of the vehicle can be detected accurately since the drift resulting from the bearing computation by the angular velocity sensor is cancelled.

The method of detecting the bearings of a vehicle according to the present invention is still further characterized by the steps of, making use of the fact that the bearing of the vehicle does not change when the vehicle stands still, minimizing the drift resulting from bearing computation by obtaining the center value $G_{dc}$ of the angular velocity sensor while the vehicle is standing still, and conforming the bearing to the absolute data (e.g., that obtained from the output data of the terrestrial magnetism sensor or map data) by ignoring the bearing obtained from the angular velocity sensor if the center value $G_{dc}$ shifts in order to cancel out the draft resulting from the bearing computation.

The method of detecting the bearings of a vehicle according to the present invention is yet further characterized by the steps of continuously sampling the output data of both the terrestrial magnetism sensor and its auxiliary bearing sensor, correcting the output data of the terrestrial magnetism sensor according to the output data of the auxiliary bearing sensor when a significant difference is observed between the data, and obtaining reliable bearing data free from the influence of disturbances even if the vehicle body is magnetized. Accordingly, the vehicle bearing can be detected accurately and precise navigation becomes realizable.

Finally, the method of detecting the bearings of a vehicle according to the present invention is characterized by the steps of making use of a one-turn correction in the terrestrial magnetism sensor to obtain a reliable coefficient of correction for computation of the bearing by means of the angular velocity sensor, and minimizing the drift resulting from the bearing computation simultaneously with completing the correction of data from the terrestrial magnetism sensor. Accordingly, it becomes possible to accurately detect the bearings onward.

What is claimed is:

1. In a method for detecting the bearing of a vehicle equipped with a terrestrial magnetism sensor for producing vehicle bearing data according to terrestrial magnetism on the basis of the output data of said terrestrial magnetism sensor, the improvement comprising the steps of: employing a bearing obtained from map data when a process of recognizing the present vehicle location on the basis of said map data while said vehicle is traveling at a speed higher than a predetermined speed has been effected, and discarding output data from said terrestrial magnetism sensor.

2. The method for detecting the bearing of a vehicle as claimed in claim 1, further comprising the steps of inhibiting the use of: the bearing obtained from said map data for one of a predetermined length of time and predetermined distance covered by said vehicle while the process of recognizing said present vehicle location is being performed, and employing the bearing from the output data of said terrestrial magnetism sensor for said one of said predetermined length of time and distance covered by said vehicle.

3. The method for detecting the bearing of a vehicle as claimed in claim 1, further comprising the steps of inhibiting the use of: the bearing obtained from said map data for one of a predetermined length of time and predetermined distance covered by said vehicle while said vehicle is traveling at a speed lower than said predetermined speed, and employing the bearing obtained from the output data of said terrestrial magnetism sensor for said one of said predetermined length of time and distance covered by said vehicle.

4. The method for detecting the bearing of a vehicle as claimed in claim 1, further comprising the steps of: setting an allowable range of fluctuation for the output data of said terrestrial magnetism sensor, monitoring the difference between the bearing obtained from the output data of said terrestrial magnetism sensor and that obtained from said map data, and, when the output data of said terrestrial magnetism sensor is within said allowable range, employing the bearing obtained from the output data of said terrestrial magnetism sensor.

5. A method for detecting the bearing of a vehicle equipped with an angular velocity sensor for detecting the angular velocity of said vehicle according to the output data of said angular velocity sensor, said vehicle being also equipped with a terrestrial magnetism sensor for producing the bearing data of said vehicle based on the terrestrial magnetism, the method comprising the steps of: setting an allowable range for the fluctuation of the output data of said terrestrial magnetism sensor, and conforming the bearing obtained from said angular velocity sensor to that obtained from said terrestrial magnetism sensor when the output data of said terrestrial magnetism sensor is within said allowable range.

6. In a method for detecting the bearing of a vehicle equipped with an angular velocity sensor for detecting the angular velocity of said vehicle according to the output data of said angular velocity sensor, the improvement comprising the step of: conforming the bearing obtained from the output data of said angular velocity sensor to that obtained from map data if a process of recognizing the present vehicle location is implemented on the basis of map data while said vehicle is traveling at a speed higher than a predetermined speed.

7. The method for detecting the bearing of a vehicle as claimed in claim 6, wherein said method further comprises the step of: inhibiting the bearing obtained from the output data of the said angular velocity sensor from conforming to that obtained from said map data only for one of a predetermined time and distance interval covered by said vehicle.

8. The method for detecting the bearing of a vehicle as claimed in claim 6, wherein said method further comprises the step of: inhibiting the process of conforming the bearing obtained from the output data of said angular velocity sensor to that obtained from said map data for one of a predetermined length of time and distance covered by said vehicle, provided that said vehicle is traveling at a speed lower than said predetermined speed.

9. In a method for detecting the bearing of a vehicle equipped with an angular velocity sensor for detecting the angular velocity of said vehicle according to the output data of said angular velocity sensor, the improvement comprising the steps of: monitoring the output data of said angular velocity sensor when said vehicle is standing still and, when a drift of said output data occurs, processing the bearing obtained from the output data of said angular velocity sensor in accordance with a predetermined procedure.

10. The method for detecting the bearing of a vehicle as claimed in claim 9, wherein said predetermined procedure comprises conforming the bearing obtained from the output data of said angular velocity to that obtained from the output data of a terrestrial magnetism sensor.

11. The method for detecting the bearing of a vehicle as claimed in claim 9, wherein said predetermined procedure comprises conforming the bearing obtained from the output data of said angular velocity to that obtained from map data.

12. A method for processing data from a terrestrial magnetism sensor mounted on a vehicle equipped with a vehicle navigation system having an auxiliary bearing sensor for detecting a direction in which said vehicle is traveling, comprising the steps of: sampling the output data from both said sensors per one of a unit distance and time covered by said vehicle and, when a significant difference is recognized therebetween, correcting the output data of said terrestrial magnetism sensor according to the output data of said auxiliary bearing sensor.

13. The method for processing data from a terrestrial magnetism sensor as claimed in claim 12, wherein said auxiliary bearing sensor is an angular velocity sensor for detecting the angular velocity of said vehicle.

14. A method for processing data from an angular velocity sensor in a vehicle navigation system having said angular velocity sensor for detecting the angular velocity of a vehicle and a terrestrial magnetism sensor for producing bearing data of said vehicle based on terrestrial magnetism, said vehicle navigation system being used to detect the bearing of said vehicle from the output data of said angular velocity sensor and said terrestrial magnetism sensor, comprising the steps of: detecting a turn of said vehicle, computing the angle of said turn according to the output data of said angular velocity sensor and the angle of said turn according to the output data of said terrestrial magnetism sensor, and establishing the ratio of the former to the latter as a coefficient of correction for said angular velocity sensor.

15. The method for processing data from an angular velocity sensor as claimed in claim 14, wherein the output data of said terrestrial magnetism sensor is employed to decide whether said vehicle is turning.

16. The method for processing data from an angular velocity sensor as claimed in claim 15, wherein the output data of said terrestrial magnetism sensor with respect to one turn of said vehicle is corrected simultaneously with the turning said vehicle.

* * * * *